(12) United States Patent
Stoltz et al.

(10) Patent No.: US 9,303,782 B2
(45) Date of Patent: Apr. 5, 2016

(54) TOILET LEAK DETECTION KIT AND METHOD

(71) Applicant: AR VALVE GROUP, LLC., Houston, TX (US)

(72) Inventors: Amber Stoltz, Houston, TX (US); Richard Bearden, Houston, TX (US)

(73) Assignee: AR VALVE GROUP, LLC., Houston, TX (US)

( * ) Notice: Subject to any disclaimer, the term of this patent is extended or adjusted under 35 U.S.C. 154(b) by 33 days.

(21) Appl. No.: 14/275,203

(22) Filed: May 12, 2014

(65) Prior Publication Data

US 2015/0323097 A1 Nov. 12, 2015

(51) Int. Cl.
*F16K 31/48* (2006.01)
*E03D 1/00* (2006.01)
*E03D 11/00* (2006.01)

(52) U.S. Cl.
CPC . *F16K 31/48* (2013.01); *E03D 1/00* (2013.01); *E03D 11/00* (2013.01); *Y10T 137/0324* (2015.04); *Y10T 137/86389* (2015.04)

(58) Field of Classification Search
CPC ........... F16K 31/48; E03D 11/00; E03D 1/00; Y10T 137/7727; Y10T 137/86389
USPC .......................... 137/624.11; 4/623
See application file for complete search history.

(56) References Cited

U.S. PATENT DOCUMENTS

| | | | |
|---|---|---|---|
| 5,568,825 A | 10/1996 | Faulk | |
| 5,782,263 A | 7/1998 | Isaacson, Jr. | |
| 6,052,841 A | 4/2000 | Mankin et al. | |
| 6,058,519 A | 5/2000 | Quintana | |
| 6,178,569 B1 | 1/2001 | Quintana | |
| 6,367,096 B1 | 4/2002 | Quintana | |
| 6,389,852 B1 | 5/2002 | Montgomery | |
| 6,612,323 B1 | 9/2003 | Horne | |
| 6,671,893 B1 | 1/2004 | Quintana et al. | |
| 6,675,826 B1 | 1/2004 | Newman et al. | |

(Continued)

FOREIGN PATENT DOCUMENTS

RU 2232852 7/2004
WO WO2006042053 A2 4/2006

OTHER PUBLICATIONS

PCT International Search Report, PCT Application No. PCT/US2015/030114, Sep. 10, 2015.

*Primary Examiner* — Kevin Lee
(74) *Attorney, Agent, or Firm* — Kenneth L. Nash

(57) ABSTRACT

The present invention provides an easily mounted, self-contained, compact fluid leak detection kit and/or method. The kit housing can be mounted by a homeowner or contractor between the wall outlet and the toilet input. When water begins to flow through the kit housing, a sensor such as a flow switch closes and applies voltage to the time delay relay. As long as the flow continues, the relay will count down the amount of preset time. The kit provides an adjustment to set a predetermined delay time, which is easily accessible and adjustable to the normal operating cycle time of any particular toilet. After adjusting the timer to the normal operating cycle time of the toilet, then the kit simply allows normal operation of the toilet as long as flow stops before the flow cycle. However, when a time has elapsed during the flow cycle to thereby indicate a problem leak, the relay will send voltage to a solenoid valve, which will stop the flow. The flow will remain stopped until an easily accessible reset button is depressed manually.

20 Claims, 3 Drawing Sheets

(56) References Cited

U.S. PATENT DOCUMENTS

| | | | |
|---|---|---|---|
| 6,708,722 B1 * | 3/2004 | Goodenough | E03B 7/071 137/460 |
| 6,810,902 B2 * | 11/2004 | Bootka | E03C 1/242 137/2 |
| 6,934,976 B2 * | 8/2005 | Parsons | E03D 1/142 251/29 |
| 6,934,977 B1 | 8/2005 | Quintana et al. | |
| 7,000,627 B1 | 2/2006 | Johnson | |
| 7,293,583 B2 | 11/2007 | Arigoni | |
| 7,851,094 B2 | 12/2010 | Burke et al. | |
| 8,209,791 B2 | 7/2012 | Williams | |
| 8,209,792 B1 | 7/2012 | Quintana et al. | |
| 8,566,971 B2 | 10/2013 | Stauber et al. | |
| 2006/0162788 A1 | 7/2006 | Arigoni | |
| 2009/0241248 A1 * | 10/2009 | Vollmar | E03D 5/105 4/313 |
| 2010/0212748 A1 | 8/2010 | Davidoff | |
| 2011/0113542 A1 | 5/2011 | Stauber | |
| 2012/0211094 A1 | 8/2012 | Quintana et al. | |
| 2013/0092242 A1 | 4/2013 | Guy | |

* cited by examiner

TOILET LEAK DETECTION KIT AND METHOD

BACKGROUND OF THE INVENTION

1. Field of the Invention

One possible embodiment of the present disclosure relates generally to the field of leak detection and water shutdown systems and, more specifically, to a self-contained compact fluid leak detection easily mounted kit that comprises an apparatus and/or method to reliably cut off the flow of water to fluid operated devices such as an appliance, toilet, and the like. Otherwise the compact, easily mounted kit allows normal operation of the toilet.

2. Background of the Invention

When left unattended, leaks in high rise condominium vacation homes and standalone vacation homes can cause damage throughout the building during the months that the vacation homes can be vacant. For that matter, if a homeowner is out for the day or week, a toilet leak can cause extensive damage. Unattended leaks in upper level condominiums can cause considerable damage throughout the building on all lower floors. High rise condominium owners living in another city can receive calls from the homeowner association about insurance against legal liabilities for the many lower condominiums that are extensively damaged.

Accordingly, home owners generally and home owner associations in high rise condominiums have long sought simple inexpensive easily mounted kits that greatly reduce likelihood of threats of legal liabilities and/or prevent extensive damage.

Moreover slow leaks in appliances such as toilets can also lead to costly water bills. Severe leaks can lead to devastating damage to homes and possibly even surrounding homes.

Prior art devices either do not provide simple to install kits that a homeowner or contractor can install with basic hand tools. As best as can be determined, the only existing prior art kit for the toilet does not protect against many types disastrous toilet leaks.

Leak detection apparatuses and systems are well known in the art but for many reasons are not suitable and/or able to prevent damage and do not provide an easily mounted kit. The following patents discuss different background art related to the subject matter discussed above:

United States Patent Application No. 2013/0092242, published Apr. 18, 2013 to Guy, discloses an apparatus and method for fluid leak detection and shut down for a fluid distribution system having a total system flow rate. The apparatus includes a solenoid shutoff valve having a normally open state and an activated closed state with a flow capacity matched to the total fluid distribution system flow rate. The apparatus also has a primary fluid flow line and a smaller capacity secondary fluid flow line. The apparatus includes a flow sensor in fluid communication with the secondary fluid flow line, wherein the flow sensor has a perceptible output and a flow rate capacity less than the solenoid shutoff flow capacity. Operationally, the flow sensor receives a portion of the solenoid shutoff valve flow capacity in priority over the primary fluid flow line, allowing the flow sensor to detect minimal flow rates and using the perceptible output to activate the solenoid shutoff valve into the closed state. However, the device is complicated and monitors the entire water supply for an edifice rather than provide a convenient, easily mounted compact kit.

United States Patent Application No. 2012/0211094, published Aug. 23, 2012 to Quintana, discloses a device to shutoff a water supply to a toilet diverts water from a toilet fill valve to a shut-off valve that has a housing that includes a valve mechanism, a trip mechanism, and a trip circuit. The trip mechanism includes a rotational spring that urges closing of the valve mechanism. A trip latch is adapted to prevent closing of the valve mechanism except when withdrawn from the valve mechanism by a solenoid that is electrically connected to the trip circuit. The trip circuit includes at least one trip sensor input and a power source, such that when the trip circuit detects a fault condition on any of the trip sensors, the trip circuit connects power to the solenoid to withdraw the solenoid to close the valve mechanism. A rest knob may then be rotated to reset the valve mechanism into a valve-open position.

United States Patent Application No. 2010/0212748, published Aug. 26, 2010 to Davidoff, discloses systems and methods for detecting and preventing fluid leaks. A rate of flow of a portion of fluid flowing through a fluid distribution network over a period of time is monitored. A determination is made whether the rate of flow of the fluid over the period of time is greater than zero but so low that it indicates a leak in the water pipe. If the rate of flow over the period of time indicates a leak, then the flow of the liquid through the system is stopped and an indication is provided that a leak has been detected.

U.S. Pat. No. 6,675,826, issued Jan. 13, 2004 to Newman et al., discloses a flood prevention system including a double-latching solenoid valve that shuts off a water supply line in response to a moisture sensor detecting a leak in a plumbing system. The double-latching feature provides the solenoid's plunger with two positions of equilibrium. This minimizes electrical power consumption so that the flood prevention system can be battery operated. To minimize a buildup of hard water deposits, the valve includes a flexible diaphragm and is cycled periodically regardless of whether flooding occurs. The sensor includes multiple methods of mounting to a floor.

U.S. Pat. No. 6,612,323, issued Sep. 2, 2003 to Horne, presents a safety valve provided for an appliance having an electrically operated water inlet valve for receiving water used during operation of the appliance. A valve body is connected to the water supply upstream of the inlet valve, the valve body having a flow path for allowing water to flow through the valve body to the inlet valve. An electrically operated solenoid is connected to a valve gate, the valve gate being movably carried within the valve body and movable between a closed position and an open position that allows water to flow through the flow path. A portion of an electrical current from an appliance control system to the inlet valve for opening the inlet valve is conducted to the solenoid for moving the gate to the open position. The gate is spring biased to the closed position for returning the gate to the closed position when the current ceases to flow.

U.S. Pat. No. 6,389,852, issued May 21, 2002 to Montgomery, discloses a water supply safety valve kit for an appliance in which the kit includes an individual solenoid actuated normally closed valve unit for each water supply line to the appliance and a control unit that plugs into a conventional electrical female household outlet. The control unit has a first outlet at the household line voltage and into which the power cord of the appliance plugs and a second lower voltage outlet responsive to current flow to the first outlet. A count down timer circuit and a low voltage output are activated by the current flow to the first outlet and lines connect that low voltage output to the solenoid valve unit to open the same. The countdown timer terminates the low voltage output after a preselected time period.

U.S. Pat. No. 6,367,096, issued Apr. 9, 2002 to Quintana, discloses a microprocessor-operated flow control device for a toilet to prevent flooding upon obstructing of a waste outlet of a toilet bowl also includes a leak detector for measuring water leakage from a toilet tank. The device includes a water level sensor assembly mounted on a clip held over a rim of the toilet bowl so as to hold the water level sensor assembly in a predetermined position within the toilet bowl, and a leak detecting element held in the interior of the toilet tank. If water bridges contacts on the water level sensor assembly, an electrical circuit or an RF connection is completed to the microprocessor in a housing, and an electric motor is actuated to drive a gear train to close a normally opened valve and shut off water to the water tank of the toilet. If a water leak is detected, an electrical or an RF signal is sent to the microprocessor to shut off water flow to the water tank.

U.S. Pat. No. 5,568,825, issued Oct. 29, 1996 to Faulk, discloses a system for detecting leakage and unwanted flow in a fluid supply within a building capable of detecting small leaks and shutting off flow when such occur. The system may be operated in a continuous mode or on a timed mode, and the system allows flow for a preset small time period before the shut-off is initiated. The system includes an inflow sensor, a discharge sensor and valve means to seal the supply conduit in the event of unwanted fluid flow or backflow in the discharge conduit. The system is extremely sensitive due to the provision of a by-pass conduit around a check-valve in the supply conduit, where the flow sensor is positioned in the by-pass conduit, such that small volume water flow must pass through the flow sensor.

The above art does not show a compact, easily mounted kit that can be easily installed by a homeowner to shut off all water going to a toilet before it enters the toilet. For the most part, The above prior art requires multiple sensors, inconvenient power requirements, in most cases very complex costly systems and in some cases may not reliably detect disastrous types of water leaks in the toilet or appliance. Only U.S. Pat. No. 6,367,096 provides a kit but this patent operates on fluid level changes in the tank that may not change for numerous types of disastrous leaks from the toilet, e.g. a leak prior to entering the toilet. An urgent need exists for an improved leak detection and shutdown apparatus that requires less power to operate and has a less complicated configuration. Those of skill in the art will appreciate the present system which addresses the above and other problems.

SUMMARY OF THE INVENTION

Accordingly, it is one object of the present invention to provide an improved leak detection and shutdown apparatus.

Another possible object is to provide a compact, easily mounted kit that can be connected as a complete package between the wall water outlet and the toilet input connector.

An additional possible object is to provide a single step adjustment to the toilet water flush/fill cycle of any particular toilet.

An additional possible object is a single reset button that allows operation of the unit after the water has been shut off with a single conveniently located reset button.

Another possible object of the present invention is to provide a leak detection apparatus with minimal power requirements and in one embodiment simply a DC battery source that last a long time.

Yet another possible object of the present invention is to provide a leak detection apparatus that more accurately measures the flow of fluid from a fluid supply, specifically low volume fluid flow.

The present invention can be sold as a single box kit that is easily installed by a homeowner simply using two connectors prior to fluid reaching the toilet. This compact construction makes the kit very sellable by large home improvement companies.

Other possible objects and advantages of the present invention will become apparent from the following descriptions, taken in connection with the accompanying drawings, wherein, by way of illustration and example, an embodiment of the present invention is disclosed. However, it will be understood that the present invention is not limited to the above and/or other objects of the invention.

In accordance with the disclosure, the present invention provides a toilet leak detection kit comprising input and output connectors that connect the kit between the wall supply outlet and toilet inlet. A flow sensor detects when fluid from the fluid supply is flowing to the toilet inlet. A timer operatively connects to the flow sensor and a latching solenoid moves between an open position that allows fluid flow through to the toilet inlet and a closed position that prevents fluid flow to the toilet inlet, the timer being operatively connected to the latching solenoid to move the latching solenoid to the closed position after a shutoff time. A reset switch is operable to move the latching solenoid from the closed position to the open position.

In one embodiment, the apparatus may further comprise at least one battery to power the timer, the latching solenoid, and the reset switch.

The timer may further comprise an adjustment operable to provide selective adjustment of the shutoff time to provide a predetermined shutoff time.

The apparatus may further comprise a housing for the timer, the flow sensor, and the latching solenoid. A reset switch may be positioned to be accessible from outside the housing.

In another embodiment, an apparatus to detect leaks in a toilet is disclosed comprising a housing with input and output connections operable to connect between a toilet inlet and a flush water fluid supply that supplies water to the toilet inlet. A flow sensor mounted to the housing that senses fluid to the toilet inlet. A timer mounted to the housing operatively connects to the flow sensor. A latching solenoid mounted to the housing moves between an open position that allows fluid flow to the toilet inlet and a closed position that prevents fluid flow to the toilet inlet, the timer being operably connected to the latching solenoid to move the latching solenoid to the closed position when fluid flowing through the flow sensor exceeds a shutoff time.

The apparatus may comprise a reset switch electrically connected to move the latching solenoid from the closed position to the open position.

The apparatus may further comprise at least one DC power supply to power the timer, the latching solenoid, and the reset switch.

In one embodiment, the flow sensor is operable to detect a predetermined minimum fluid flow above which the flow sensor produces a flow signal, the predetermined minimum being selected to be less than an unrestricted flow for a selected toilet. The flow sensor may further comprise normally open contacts that close when fluid flows through the flow sensor above the minimum fluid flow that produces the flow signal.

The timer may comprise an adjustment operable to provide selective adjustment of the shutoff time to provide a predetermined shutoff time.

In another embodiment, the reset switch is mounted to the housing in a position allowing access to operate the reset switch from outside the housing.

In yet another embodiment, the present invention provides a method to detect leaks in a toilet when the toilet is connected to a fluid supply, which may comprise the steps of providing a flow control apparatus with connections to fluidly connect between a toilet water supply and a toilet inlet for the toilet, providing a flow sensor that detects fluid flowing into the toilet inlet, providing a timer responsive to the flow sensor, and providing a latching solenoid moveable between an open position that allows fluid flow into the toilet inlet and a closed position that prevents fluid flow to the toilet inlet, the latching solenoid being operatively connected to the timer to terminate fluid flow from the fluid supply after a time period.

Other steps may comprise providing a reset switch to move the latching solenoid from the closed position to the open position and providing that the toilet water supply and a toilet inlet for the toilet are positioned within five feet of each other.

The method may comprise providing at least one DC power supply to power the timer, the latching solenoid, and the reset switch.

The method may further comprise providing that the timer is operable to adjust a predetermined shutoff time for the shutoff time.

In one embodiment, the method may comprise the step of providing that the toilet water supply comprises a wall outlet adjacent to the toilet.

Another step may include mounting the timer, the flow sensor, a power supply, and the latching solenoid to a housing.

A further step may include mounting a reset switch to the housing in a position that allows access to the reset switch from outside the housing.

BRIEF DESCRIPTION OF THE DRAWINGS

The accompanying drawings, which are incorporated in and constitute a part of this specification, illustrate an implementation of apparatus consistent with one possible embodiment of the present disclosure and, together with the detailed description, serve to explain advantages and principles consistent with the disclosure. In the drawings.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. A kit as used herein could include a package, housing, apparatus, or the like. A self-contained compact kit is easily mounted between the water source and toilet inlet to completely control fluid flow into the toilet.

In a preferred embodiment, leak detection apparatus is a battery operated flow/stop system that is controlled by a solid state time delay relay. A standard DC battery will last at least one year in the present system. An annual battery replacement reminder may be sent by email or placed on the calendar when the Bluetooth option is utilize. Alternatively a battery voltage detection system may be utilized to show existing status and may predict long term battery status.

When a predetermined minimum amount of water begins to flow through the conduit, a flow sensor such as a flow switch closes and applies voltage to the time delay relay. As the flow continues, a relay timer will count down the amount of preset time before a signal is sent to a relay. The relay timer is adjustable to each application, such as different lengths of time to flush between, for example, a power flush toilet that lasts a few seconds and a flapper valve toilet that may take about thirty seconds. An additional time period could be used over the typical time if desired, and when the preset time has elapsed during the flow cycle, the relay will send voltage to a relay or solenoid valve, which will stop the flow.

The flow can remain stopped indefinitely until a reset button is depressed manually. Accordingly, if a longer than normal flush time is exceeded, a leak is indicated. The fluid flow is stopped at the wall before the water goes to the toilet thus preventing any known type of toilet leak, of which many different types may occur. For example, the toilet bowl may receive continuous flow with little change in fluid level in the tank. A leak could occur at the input connector of the toilet, which results in otherwise flooding the bathroom. Some fluid will still flow onto the floor but it is quite limited. Recalls have been sent out for some types of power flush toilets due to explosions that apparently may result in continuous flow onto the floor of the bathroom.

Figure 1:
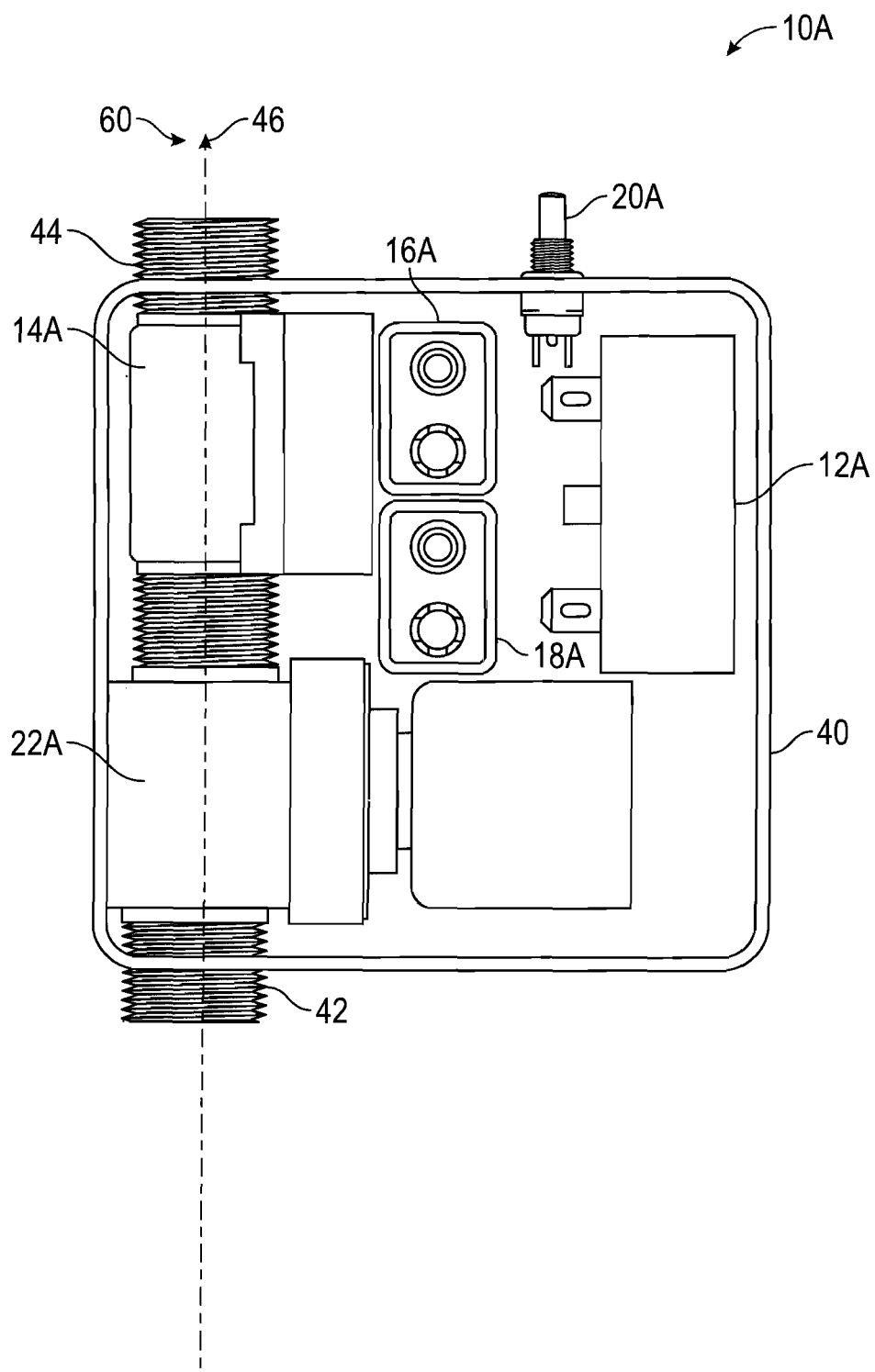
FIG. 1 illustrates an embodiment of a fluid leak detection apparatus in accord with one possible embodiment of the present invention.
Figure 4:
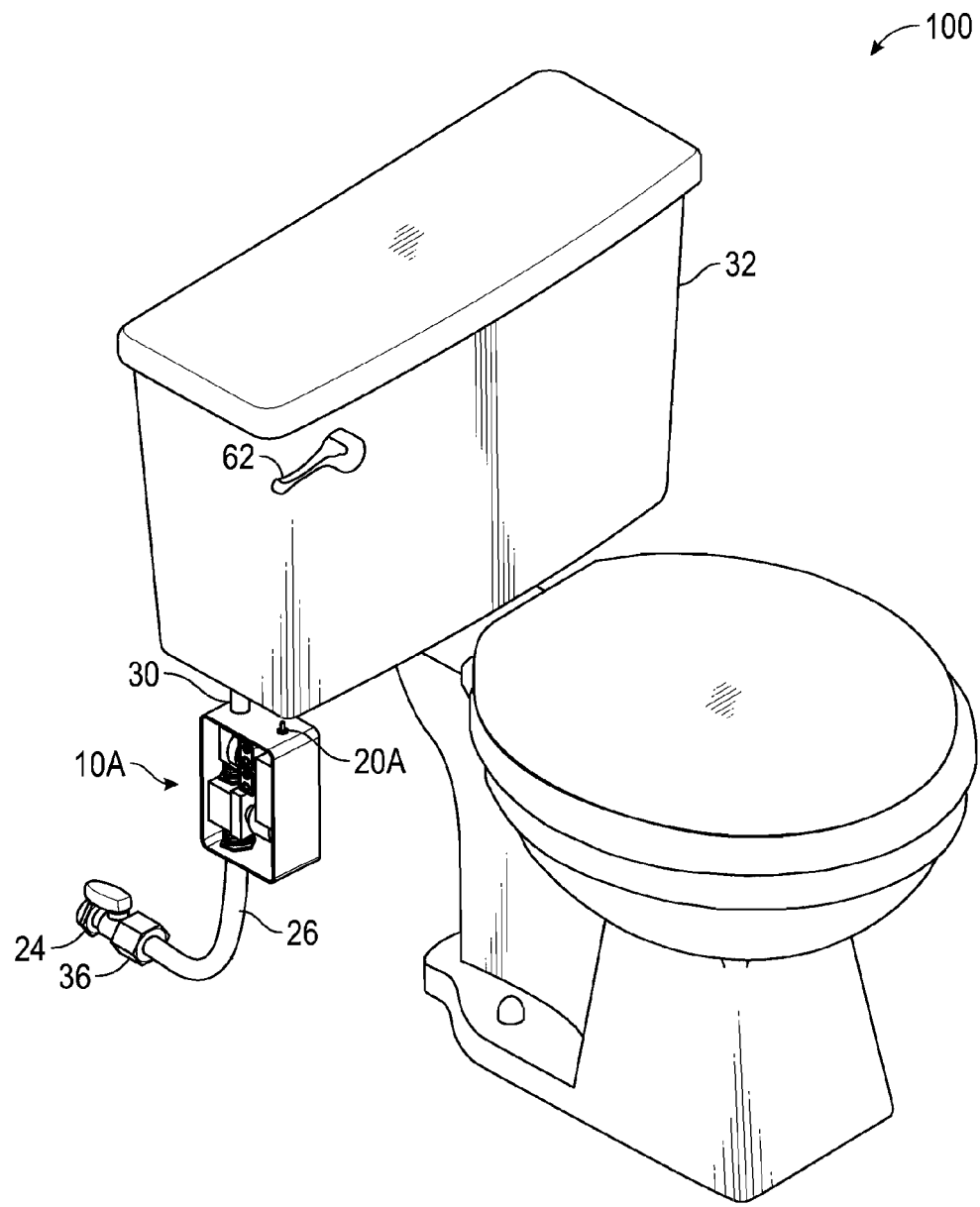
FIG. 4 is a perspective view of a fluid leak detection apparatus installed on a toilet in accord with one possible embodiment of the present invention.

Turning now to the drawings, and more particularly FIG. 1, fluid leak detection apparatus 10A is shown in accord with one possible embodiment of the present invention. FIG. 4 shows one possible mounting on the toilet for fluid leak detection apparatus 10A. Referring again to the non-limiting example of FIG. 1, leak detection apparatus 10A comprises housing 40 which contains flow switch 14A, latching solenoid or other type of relay 22A, solid state delay timer 12A, and power supplies 16A, 18A. In this embodiment, latching solenoid 22A is fluidly connected to flow switch 14A. An additional conduit may or may not be utilize. In the operation mode, latching solenoid 22A is in a normally open position allowing fluid to pass there through. Latching solenoid 22A and flow switch 14A define flow path 60 designated by the dotted lines that flows along flow axis 46.

In operation, fluid enters leak detection apparatus 10A at fluid inlet 42 and travels along flow path 60 before exiting outlet 44 as indicated by flow axis 46. Flow switch 14A may have normally open contacts, which close when fluid greater than a minimum flow rate begins to flow through flow switch 14A. The invention is not limited to any particular type of flow switch or flow sensor. The sensitivity of water flow of flow switch 14A can be selected or chosen for a desired appliance, e.g. an icemaker or a toilet. For example, the flow switch could be sensitive to a flow that is one-fifth of that of normal operation of the toilet. Once the contacts close, timer 12A initiates a countdown for a predetermined shutdown time. In a preferred embodiment, flow switch 14A can accommodate approximately a quarter of a gallon of fluid a minute. In other embodiments, flow switch 14A could be configured to handle a smaller flow rate for appliances, such as ice makers, water dispensers, and the like, which require less water to operate than a toilet. Flow switch 14A preferably detects total water flow into the toilet or appliance.

In one embodiment, flow switch 14A operates with a minimum flow rate for the current toilet valves shows to be 0.5 liters/minute to sense flow. That is 0.13 US Gallons per minute. An icemaker minimum flow rate may need to be lower than this and may utilize a smaller diameter water input tubular.

In a preferred embodiment, timer 12A is a solid state time delay timer with an adjustable delay time to change the predetermined shutdown time for different applications. If the predetermined shutdown time has been reached on timer 12A, then latching solenoid 22A is energized into a closed position and blocks flow path 60 preventing further fluid flow. A latching relay remains latched in position, either closed or open, thereby eliminating the need for battery power to hold the relay in position. Significant battery power is only needed to switch the latch between the open and closed positions. Accordingly, battery life is quite long.

If the predetermined shutdown time is not reached due to cessation of fluid flow 60, then flow switch 14A no longer applies voltage to timer 12A, and timer 12A then resets to zero. Timer 12A then starts timing from zero at the next cycle. On the other hand if the predetermined shutdown time is reached, then timer 12A produces a signal to operate latching relay 22A thereby shutting off fluid flow. Button 20A provides a convenient way to restart operation of the toilet by switching latching relay back to allow flow along flow path 60.

Figure 2:
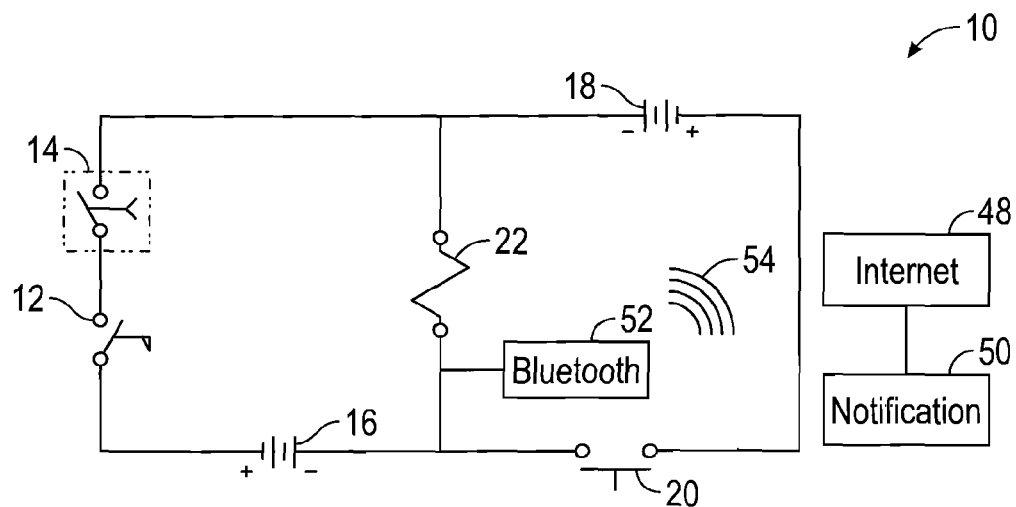
FIG. 2 is an electrical wiring diagram of a fluid leak detection apparatus in accord with one possible embodiment of the present invention.

Looking now to FIG. 2, an electrical wiring diagram of fluid leak detection apparatus 10 is depicted in accord with one possible embodiment of the present invention. After fluid enters apparatus 10 and passes through flow switch 14, the normally open contacts of flow switch 14 will close and send a signal to timer 12. In a preferred embodiment, timer 12 will be adjustable to accommodate differing fill times for individual toilets and/or other appliances. After receiving a flow signal from flow switch 14, timer 12 initiates a countdown sequence based on a predetermined shutdown time and will continue this countdown as long as fluid flows through flow switch 14. Timer 12 is powered by power supply 16, which in a preferred embodiment is a DC battery, such as a standard 9 volt battery or any standard battery configuration. If the shutdown time is not reached, the flow switch contacts will open, thus resetting timer 12 to zero.

Once this predetermined shutdown time has been reached, timer 12 will send a shutdown signal to solenoid 22. Solenoid 22, normally latched in an open position, will activate and latch in a closed position to block the flow of fluid into apparatus 10 until reset switch or button 20 is manually depressed. Switch 20 is powered by DC battery 18 and is wired for reverse polarity with solenoid 22, so that when reset switch 20 is initiated, latching solenoid 22 resets to its original open position with respect to fluid flow through apparatus 10 allowing normal flow.

In one embodiment, Bluetooth sensor 52 may be integrated into apparatus 10 to power on and produce signal 54 after latching solenoid 22 has been activated. If a Bluetooth enabled device is in close proximity to apparatus 10, signal 54 would then initiate pushing a message directly to a user's phone to alert them of issues with a toilet. In another embodiment, signal 54 would connect to internet application 48, which would send notification 50 to an end user.

Figure 3:
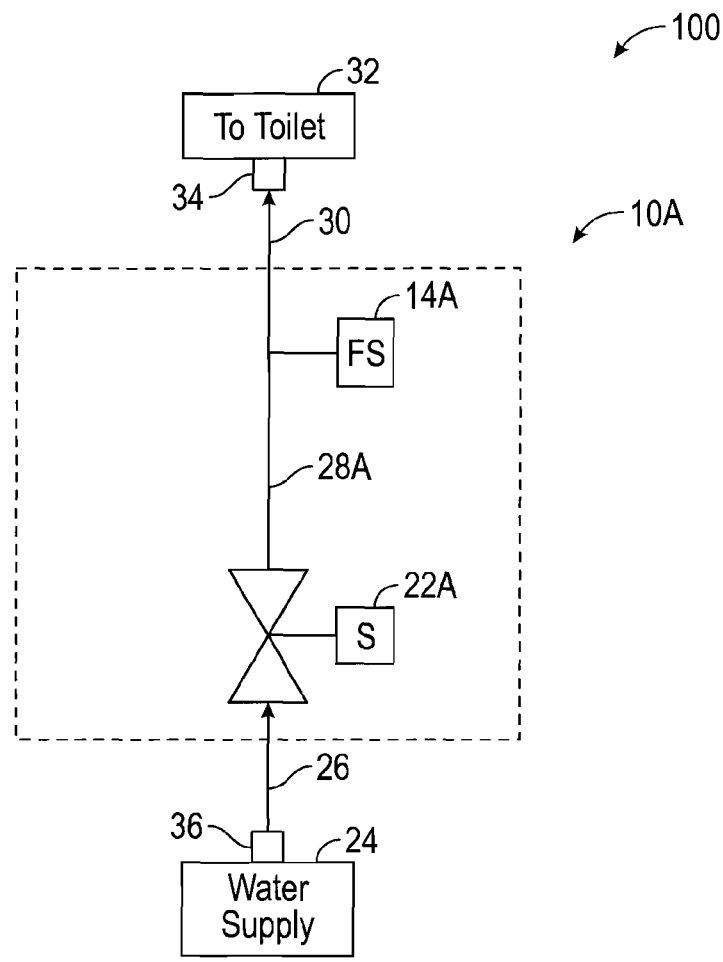
FIG. 3 is a diagram of a fluid leak detection apparatus installed on a toilet in accord with one possible embodiment of the present invention.

Looking now to FIG. 3, fluid leak detection system 100 is depicted in accord with one possible embodiment of the present invention. Leak detection apparatus 10A connects to water supply 24 through water supply hose 26 at fluid supply connection 36 on one end and is operably connected to toilet 32 at toilet connection 34 by outlet hose 30. It is understood that connection 34 may be differently located for different toilets and will preferably comprise a connection for fluid to supply flush water for the toilet. Fluid will enter leak detection apparatus 10A and pass through solenoid 22A and connection therebetween 28A, which could be of various types including an additional conduit, before reaching flow switch 14A. As discussed hereinbefore, fluid enters flow switch 14A and activates a timer. Once timer has reached a predetermined shutdown time relative to the time currently accounted for, the timer will send a signal to close latching solenoid 22A and prevent further fluid flow through leak detection apparatus 10A.

Finally, FIG. 4 is a perspective view of fluid leak detection system 100 in accord with one possible embodiment of the present invention. Fluid leak detection apparatus 10A is installed between water supply 24 and toilet 32. Apparatus 10A is connected to water supply 24 at fluid supply connection 36 by water supply hose 26 and connected to toilet 32 by outlet hose 30 at toilet connection 34 (See FIG. 3). Water supply 24 may be a wall water supply that comes out of the wall or other suitable water supply for the toilet. Preferably conveniently located next to the toilet within five feet or three feet or two feet. Once handle 62 (see FIG. 4) is depressed, toilet 32 evacuates its contents and water begins to fill toilet 32. As water passes through leak detection apparatus 10A, a timer will count time until water stops flowing through apparatus 10A. If fluid flow stops before reaching a predetermined shutdown time, then apparatus 10A will revert to its standby operation until toilet 32 is used again. If fluid flow does not stop before reaching a predetermined shutdown time, then apparatus 10A will act to prevent further fluid flow from water supply 24 until reset switch 20A is depressed manually. This will prevent unwanted continuous water flow until the situation has been addressed.

In operation, a predetermined shutdown time is determined by measuring a length of a flush cycle time of a toilet from the time the handle is moved until water flow through the toilet stops. This may be about 30 seconds. For reliability purposes, 15 to 30 additional seconds may be added to the flush cycle time. The apparatus is mounted as indicated in FIG. 4. The predetermined shutdown time might then be 45 seconds, which is fed into timer 12, 12A using an adjustment. A power LED light may be provided or the unit may simply be on when the battery is connected. The apparatus 10, 10A is now ready for operation. Normal flushing will not affect operation. However, if there is a problem, the unit shuts off the water flow from the supply outlet, which typically comes out of the wall adjacent the toilet. It will be appreciated that in this particular embodiment, the unit is not designed to detect leaks that occur upstream from the apparatus. The unit is normally connected as indicated and not to the input for the house because the flow rates are much different. The flow cycle for the whole house, if there is one, and the diameter of the flow switch for a toilet will not typically be adequate to provide whole house water supply monitoring.

While certain exemplary embodiments have been described in details and shown in the accompanying drawings, it is to be understood that such embodiments are merely illustrative of and not devised without departing from the basic scope thereof, which is determined by the claims that follow. Moreover, it will be appreciated that numerous inventions are disclosed herein which are taught in various embodiments herein and that the inventions may also be utilized within other types of equipment, systems, methods, and machines so that the invention is not intended to be limited to the specifically disclosed embodiments.

What is claimed is:

1. A kit to detect leaks in a toilet when said kit is connected to a wall fluid supply, said toilet comprising a water inlet, said wall fluid supply comprising a supply outlet, said kit comprising:
    input and output connectors mounted to a kit housing that connect said kit between said supply outlet and said water inlet, respectively;
    a flow sensor that detects when fluid from said fluid supply is flowing to said toilet inlet;
    a timer operatively connected to said flow sensor;
    a latching solenoid moveable between an open position that allows fluid flow through to said toilet inlet and a closed position that prevents fluid flow to said toilet inlet, said timer being operatively connected to said latching solenoid to move said latching solenoid to said closed position after a shutoff time;
    a reset switch operable to move said latching solenoid from said closed position to said open position; and
    said flow sensor, said timer, said latching solenoid, and said reset switch being mounted to said kit housing.

2. The kit of claim 1, further comprising at least one battery to power said timer, said latching solenoid, and said reset switch.

3. The kit of claim 1, wherein said timer comprises an adjustment operable to provide selective adjustment of said shutoff time to provide a predetermined shutoff time.

4. The kit of claim 1, further comprising a wireless connection operable to initiate sending a signal indicative of said latching relay being moved to said closed position through at least of the Internet or a phone.

5. The kit of claim 1 further comprising said reset switch positioned to be accessible from outside said kit housing.

6. An apparatus to detect leaks in a toilet, comprising:
    a housing comprising input and output connections operable to connect between a toilet inlet and a water fluid supply that supplies water to said toilet inlet;
    a flow sensor mounted to said housing that senses fluid to said toilet inlet;
    a timer mounted to said housing operatively connected to said flow sensor; and
    a latching solenoid mounted to said housing moveable between an open position that allows fluid flow to said toilet inlet and a closed position that prevents fluid flow to said toilet inlet, said timer being operably connected to said latching solenoid to move said latching solenoid to said closed position when fluid flowing through said flow sensor exceeds a shutoff time.

7. The apparatus of claim 6, further comprising a reset switch electrically connected to move said latching solenoid from said closed position to said open position.

8. The apparatus of claim 7, further comprising at least one DC power supply to power said timer, said latching solenoid, and said reset switch.

9. The apparatus of claim 6, wherein said flow sensor is operable to detect a predetermined minimum fluid flow above which the flow sensor produces a flow signal, said predetermined minimum being selected to be less than one-third of an unrestricted flow for a selected toilet without affecting said unrestricted flow.

10. The apparatus of claim 9, said flow sensor further comprising normally open contacts that close when fluid flows through said flow sensor above said minimum fluid flow that produces said flow signal.

11. The apparatus of claim 6, wherein said timer comprises an adjustment operable to provide selective adjustment of said shutoff time to provide a predetermined shutoff time.

12. The apparatus of claim 7, further comprising said reset switch being mounted to said housing in a position allowing access to operate said reset switch from outside said housing.

13. A method for making a flow control apparatus to detect leaks in a toilet when said toilet is connected to a toilet water supply, comprising:
    providing a flow control apparatus with connections to fluidly connect between said toilet water supply and a toilet inlet for said toilet;
    providing a flow sensor that detects fluid flowing into said toilet inlet;
    providing a timer responsive to said flow sensor;
    providing a latching solenoid moveable between an open position that allows fluid flow into said toilet inlet and a closed position that prevents fluid flow to said toilet inlet, said latching solenoid being operatively connected to said timer to terminate fluid flow from said toilet water supply after reaching a shutoff time;
    providing a housing with said connections for said flow control apparatus; and
    mounting said timer, said flow sensor, a power supply, and said latching solenoid to said housing.

14. The method of claim 13 further comprising providing a reset switch to move said latching solenoid from said closed position to said open position.

15. The method of claim 13 further comprising providing that said toilet water supply and said toilet inlet for said toilet are positioned within five feet of each other.

16. The method of claim 14, further comprising providing at least one DC power supply to power said timer, said latching solenoid, and said reset switch.

17. The method of claim 16, further comprising providing that said timer is operable to adjust a predetermined shutoff time for said shutoff time.

18. The method of claim 13, further comprising providing that said toilet water supply comprises a wall outlet adjacent to said toilet.

19. The method of claim 13, further comprising providing a Bluetooth connection operable to initiate sending a signal indicative of leak detection through at least of the Internet or a phone.

20. The method of claim 13, further comprising mounting a reset switch to said housing in a position that allows access to said reset switch from outside said housing.

* * * * *